Figure 1:
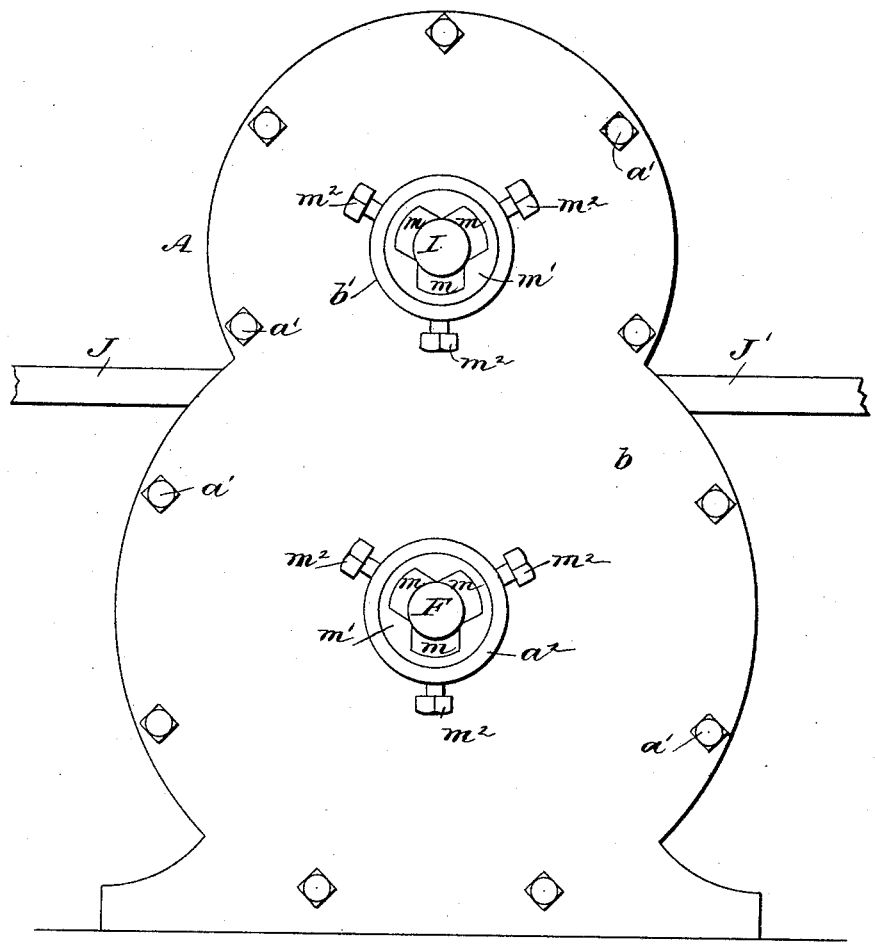

(No Model.)

P. P. BELT.
ROTARY ENGINE.

No. 345,875. Patented July 20, 1886.

2 Sheets—Sheet 1.

WITNESSES:

INVENTOR:
P. P. Belt
BY Munn & Co
ATTORNEYS.

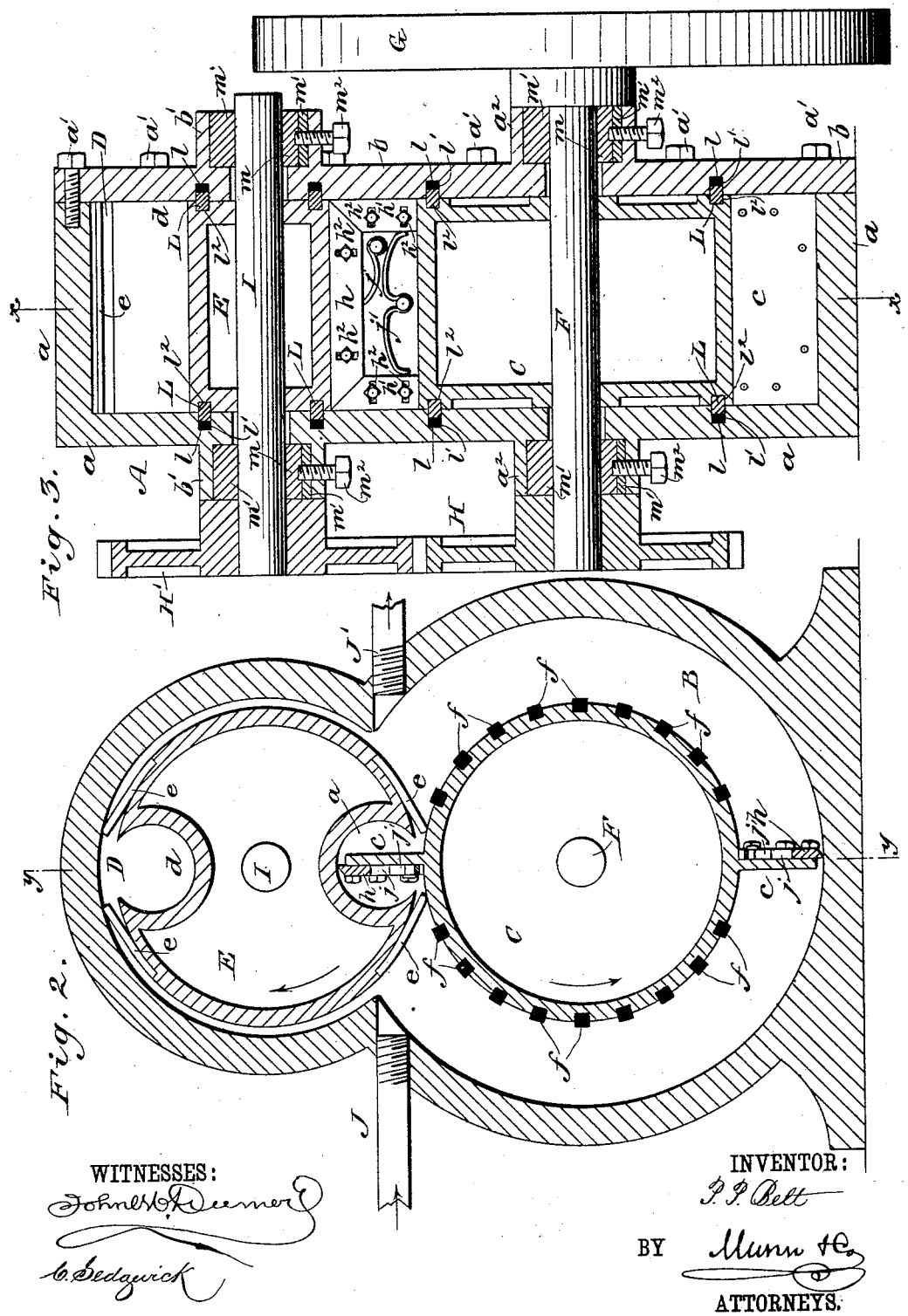

UNITED STATES PATENT OFFICE.

PERLEY P. BELT, OF COLUMBUS, KANSAS.

ROTARY ENGINE.

SPECIFICATION forming part of Letters Patent No. 345,875, dated July 20, 1886.

Application filed April 24, 1886. Serial No. 200,100. (No model.)

*To all whom it may concern:*

Be it known that I, PERLEY P. BELT, of Columbus, in the county of Cherokee and State of Kansas, have invented a new and Improved Rotary Engine, of which the following is a full, clear, and exact description.

The object of my invention is to provide a cheap and practical rotary engine, wherein the power will be equal at all points of the revolution, and wherein a very high rate of speed may be maintained without excessive use of steam.

The invention consists in the construction, arrangement, and combination of parts, all as hereinafter described and claimed.

Reference is to be had to the accompanying drawings, forming a part of this specification, in which similar letters of reference indicate corresponding parts in all the figures.

Figure 1 is a side elevation of my new rotary engine. Fig. 2 is a sectional elevation of the same on the line $x\ x$, Fig. 3. Fig. 3 is a transverse sectional elevation on the line $y\ y$, Fig. 2.

The casing A of the engine is composed of the main box-casing $a$ and the removable side plate, $b$, secured to the box-casing $a$ by the heavy bolts $a'$. The casing A is shaped to form the lower circular chamber, B, in which the piston-drum C works, and the upper communicating chamber, D, in which the valve E works. The piston-drum C is formed or provided with the rigid radial vanes or pistons $c$, and it is made fast upon the main shaft F, which is journaled in bearings held by the collars $a^2$, formed upon the outer surfaces of the main casing A. The shaft F carries the fly-wheel G at one end and the cog-wheel H at the other.

The valve E is made circular in form, is constructed with the opposite cavities or arcs $d$, and is secured upon the upper shaft, I, which is journaled in adjustable bearings held in the collars $b'\ b'$, formed upon the outer surfaces of the casing A, and carries a cog-wheel, H', at one end, which meshes with the cog-wheel H, to insure the proper registration of the arcs or cavities $d$ of the valve with the piston-vanes $c$, so that when the engine is in operation there will be no conflict of the piston-drum with the valve.

To insure steam-tight contact of the valve E with the piston-drum C, I provide the latter at its outer surface, at regular intervals between the piston-valves $c$, with packing-strips $f$, of rubber or metal, set in suitable grooves formed in the drum C, as shown clearly in Fig. 2, and to prevent the escape of steam at the time that the piston-vanes $c$ pass the valve I provide the latter, upon each side of each arc or cavity $d$, with flat springs $e$. These springs stand at a tangent to the periphery of the valve, except at the time the vanes $c$ enter the arcs or cavities $d$, when the outer surfaces of the springs run in contact with the edges of the piston-vanes, and prevent the steam from passing from the induction to the eduction side of the engine. At all other times the outer edges of the springs $e$ run in contact with the walls of the valve-chamber D, and prevent steam from blowing through the valve-chamber from the induction-pipe J to the exhaust-pipe J'.

The piston-vanes $c$ are provided with adjustable packing-strips $h$, of steel, and with adjustable side packing-strips, $h'$, to form steam-tight contact of the piston-vanes with the walls of the cylinder. The packing-strips $h$ are formed with slots $h^2$, through which bolts pass for securing the packing-strips to the valves, and these strips are constantly pressed outward by springs $j\ j'$, so that the strips, together with the springs, constitute a yielding steam-packing for the vanes.

Steam is admitted to the engine through the supply-pipe J and exhausted through the pipe J', arranged on opposite sides of the main casing A and a little above the point of contact of the valve E with the piston $c$, and the piston-drum C and the valve E are packed around their respective shafts F I by ring-packing L, which rests upon rubber springs $l$, held in annular grooves $l'$, formed in the inner walls of the main casing $a$ and the side plate, $b$, as shown clearly in Fig. 3. The packing-rings L are preferably of metal and fit in the grooves $l^2$, formed in the outer surface of the piston-drum and valve, so that all escape of steam at the journals is obviated.

In order that any wear on the outer surface of the packing $f$ of the piston-drum C may be compensated for, I adapt the shafts F I (either or both) of the drum C and the valve E to be adjusted, and for this purpose the journals of each of these shafts are each formed of segments $m$, set in the rings $m'$, which fit in collars $a^2 b'$, formed at the outer surface of the main casing of the engine. The blocks $m$ each constitute a third of a circle at their contact with the shafts, and each block is adapted to be adjusted radially by a set-screw, $m^2$, so that by turning these screws the wear on the journals will not only be taken up, but a proper parallelism of the valve with the piston-drum C may always be maintained, which is necessary to the satisfactory operation of the engine and to avoid unnecessary friction.

Although I have shown the piston-drum C formed or provided with only two piston-vanes $c$, diametrically arranged, it is obvious that I may use three or more piston-vanes, the rotary valve E being formed with a corresponding number of arcs or cavities $d$ but with only two piston-vanes $c;$ the operative parts of the engine are perfectly poised, and the pressure is equal at all points of the revolution, so that there is no dead-center, and so that the engine will start at all points when pressure is applied, and the engine may be reversed by admitting steam at the pipe J' and permitting its exhaust at the pipe J.

Having thus fully described my invention, I claim as new and desire to secure by Letters Patent—

1. The rotary valve E, formed with the arcs or cavities $d$, and having the springs $e$ placed each side of the center, in combination with the drum C, provided with the vane $c$, substantially as and for the purposes set forth.

2. The rotary valve E, formed with the cavities $d$, in combination with the springs $e$, arranged to run in contact with the inner wall of the valve-chamber, substantially as and for the purposes set forth.

3. A rotary engine comprising the casing having the two chambers B D, inlet and exhaust ports J J' in opposite sides of the lower part of chamber D, a shaft, F, journaled in chamber B, the cylindrical piston C, fixed on the shaft, and provided with opposite vanes $c$ $c$ and with packing-strips $f$, the shaft I, extending through the valve-chamber, the cylindrical valve E, having the opposite cavities $d$, to receive the vanes $c$ $c$, the springs $e$ $e$ at opposite sides of the cavities and extending at a tangent to the periphery of the valve, and the intermeshing gear-wheels H H' on the shafts F I, substantially as set forth.

PERLEY P. BELT.

Witnesses:
   GEO. M. FISHER,
   AMO CULLETON.